United States Patent [19]

Sugahara et al.

[11] 3,914,381

[45] Oct. 21, 1975

[54] PROCESS FOR THE PREPARATION OF SUBSTANTIALLY PURE PHOSPHORUS OXYACID SALTS OF METALS OF GROUP IV b "

[75] Inventors: Yujiro Sugahara, Tokyo; Hiroyuki Naito, Tsuruoka; Akira Takahashi, Tsuruoka; Kiyoshi Takai, Tsuruoka, all of Japan

[73] Assignee: Mizusawa Kagaku Kogyo Kabushiki Kaisha, Osaka, Japan

[22] Filed: Mar. 16, 1970

[21] Appl. No.: 19,751

[30] Foreign Application Priority Data
Mar. 18, 1969 Japan.............................. 44-20214
Apr. 7, 1970 Japan.............................. 45-15527

[52] U.S. Cl.................................. 423/305; 423/71
[51] Int. Cl.² ................. C01B 15/16; C01B 25/26
[58] Field of Search...................... 23/23, 242, 105; 423/304–309, 71

[56] References Cited
UNITED STATES PATENTS
3,471,252    10/1969    Sugahara et al. ..................... 23/105

3,492,085    1/1970    Sugahara et al. ................. 23/105 X
3,582,275    6/1971    Sugahara et al. ................. 23/105 X

*Primary Examiner*—Oscar R. Vertiz
*Assistant Examiner*—Gregory A. Heller
*Attorney, Agent, or Firm*—Sherman & Shalloway

[57] ABSTRACT

A process for the preparation of substantially pure phosphorus oxyacid salts of metals which comprises (a) reacting a compound of a metal of Group IV b containing metallic impurities with a phosphorus oxyacid or its reactive derivative in the presence of water; (b) separating the forming gelatinous precipitate of the phosphorus oxyacid salt of the metal of Group IV b from the mother liquor by filtration; (c) (i) converting the obtained filter cake to a fluid sol by means of shear agitation and then scattering the sol into a heating atmosphere to form a granular gel or (ii) drying the obtained filter cake, then pelletizing the dried cake to form a granular gel; and (d) extracting the granular gel of the phosphorus oxyacid salt of the metal of Group IV b with an acid or its vapor in the presence of water to thereby remove metallic impurities therefrom.

9 Claims, 1 Drawing Figure

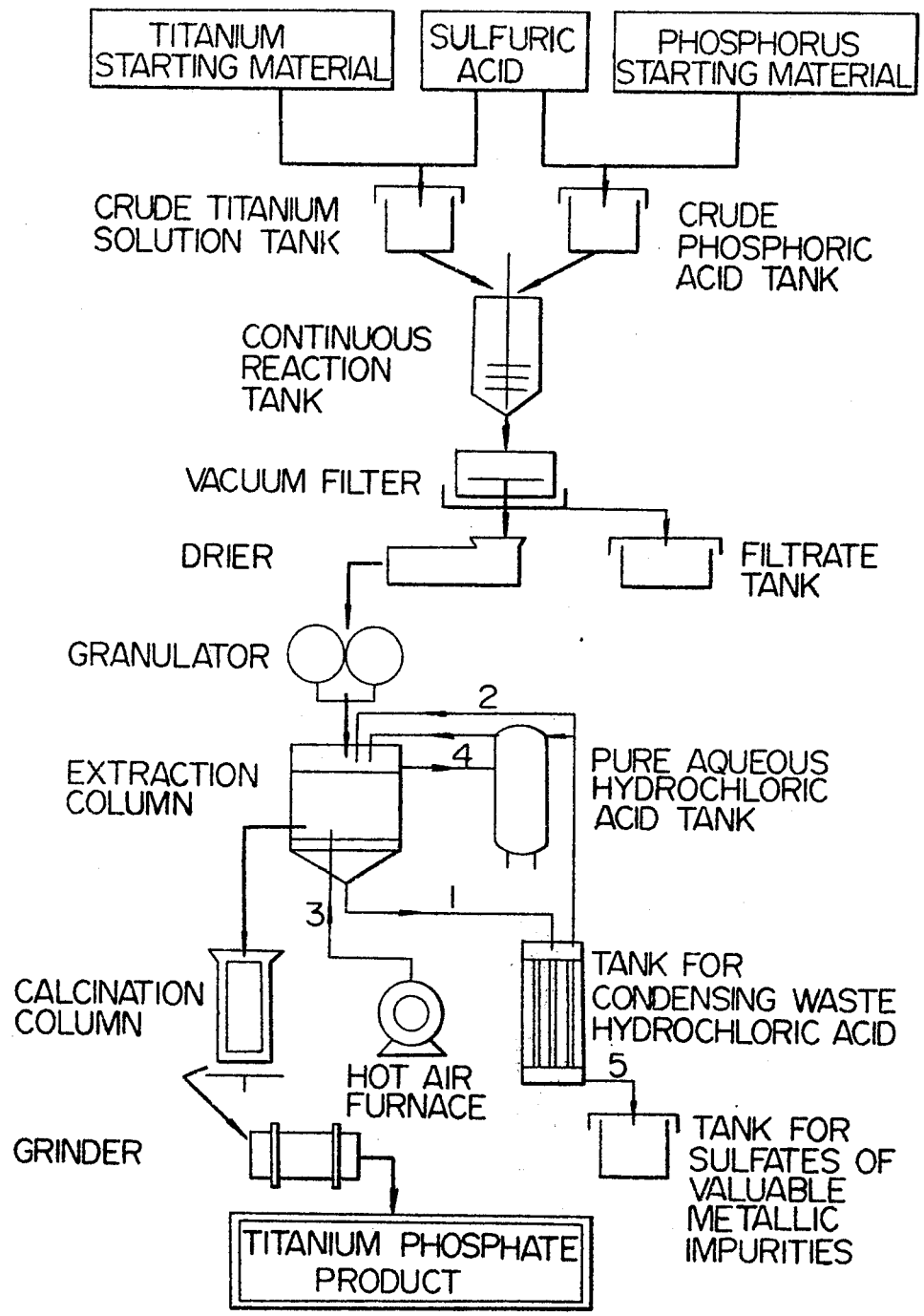

PROCESS FOR THE PREPARATION OF SUBSTANTIALLY PURE PHOSPHORUS OXYACID SALTS OF METALS OF GROUP IV b"

This invention relates to a process for the preparation of phosphorus oxyacid salts of Group IV b of the Periodic Table substantially free from metallic impurities, from metallic impurities-containing compounds of metals of Group IV b, such as crude salts, hydroxides and oxides of titanium, zirconium, hafnium and thorium or from acid extraction liquors of ores of metals of Group IV b of the Periodic Table. In the specification and claims the Periodic Table is taken from Ryutaro TSUCHIDA, Kagaku Gairon, 115 (1941).

Titanium phosphate and titanium oxide, for instance, are well-known white pigments. However, commercially available white pigments do not have entirely satisfactory whiteness owing to minute amounts of metallic impurities present in titanium compounds, for instance, Fe, Mo, Co, V, Cr and Mn carried through from starting materials in the manufacture. It is known that the presence of such metallic impurities, particularly V, in amounts as low as 0.0005% produces a bad influence on the color tone of the product.

It has been known that titanium phosphate can be obtained by reacting a titanium salt per se or an aqueous solution of a titanium salt in an acid with phosphoric acid (see, for instance, the specifications of British Pat. Nos. 261,051 and 994,669). The gelatinous precipitate of titanium phosphate obtained by such known process is generally difficult to filter or wash with water. Further, even when preferable conditions for filtration and water-washing of the precipitated gel are chosen by adjusting the concentration of the titanium component in the reaction system or the temperature, it is difficult to substantially remove metallic impurities from the titanium phosphate hydrogel by extraction, which is a fatal defect of the above known method.

It may be construed that the removal of such metallic impurities would be accomplished by eluting a titanium phosphate hydrogel with water or a dilute aqueous acid solution. However, although the filtration and separation can be performed easily at the primary stage of the elution treatment, as the amounts of metallic impurities contained in the hydrogel become small, the filtration and separation of the metallic impurities become difficult. Further, it is difficult to reduce the contents of the metallic impurities such as Fe and V to an extent not giving any influence to the whiteness of the titanium phosphate product, for instance, to less than 0.0005%, only by subjecting the titanium phosphate to an elution treatment in water or a dilute aqueous acid solution. Still further it has been found that when the titanium phosphate hydrogel obtained by the known method is treated with not only a concentrated aqueous acid solution but also a dilute aqueous acid solution, the hydrogel is gradually dissolved in the acid solution and hence, the loss of titanium phosphate, particularly the phosphoric acid component, is caused. Similar disadvantages are observed in the purification of phosphates of other metals of Group IV b, i.e., zirconium, hafnium and thorium.

As a method overcoming these defects of known methods we previously proposed a method which comprises reacting a solution of a titanium salt with a phosphorus oxyacid or its reactive derivative in the presence of water to form a stable sol or uniform jellied mass; molding the sol to small masses without filtration while the sol is being gelled or molding the jellied mass to small masses without filtration, and treating the small masses of the titanium phosphate gel with an acidic extraction medium to thereby remove metallic impurities from the gel.

This method is satisfactory in that metallic impurities contained in a titanium phosphate gel which is likely to cause cloggings of filter cloth can be effectively removed by molding it to non-crumbling small masses without filtration. However, it is still insufficient in that all the free acids and impurities contained in the titanium salt solution accompany the titanium phosphate and it takes a long time to extract these impurities. Further, in the small masses of the titanium phosphate gel obtained by the above method the titanium phosphate is diluted with great amounts of water, free acids and impurities. Accordingly, in conducting the above method a great space is necessary for the extraction. Still further, in case contents of free acids in the titanium phosphate gel are low, it is necessary to use a highly concentrated acid for the extraction of the metallic impurities, which sometimes results in lowering of the recovery ratio of titanium phosphate.

We have now found that even when a titanium salt solution is reacted with a phosphorus exyacid or its reactive derivative in the presence of water to form a slurry gel of a titanium salt of the phosphorus oxyacid, non-crumbling, firm small masses of a gel of the titanium salt of the phosphorus oxyacid stabilized against an action of an acid can be obtained from the filter cake of the titanium phosphorus oxyacid salt gel by (i) converting the above-mentioned slurry gel to a fluid sol by means of shear agitation, and then scattering the sol into a heating atmosphere to thereby convert it to a granular gel having a water content of less than 45% or (ii) drying the filter cake to such an extent that the dried cake has a water content or less than 60% but still retains a thixotropic property, pelletizing the dried cake and, when the water content in the pelletized product is higher than 45%, drying it until the water content is reduced to less than 45%; and that when the so obtained small masses of the gel of the titanium salt of the phosphorus oxyacid are subjected to an extraction treatment with an acid or a vapor thereof, the metallic impurities can be extracted and removed for a very short time and highly efficiently, as compared with conventional methods.

According to this invention there is provided a process for the preparation of substantially pure phosphorus oxyacid salts of metals of Group IV b of the Periodic Table which comprises (a) reacting a compound of a metal of Group IV b containing metallic impurities and being capable of reacting with a phosphorus oxyacid, with a phosphorus oxyacid or its reactive derivative in the presence of water at a molar ratio, expressed in terms of $MO_2 : P_2O_5$ (in which M is the metal of Group IV b), of 1:1.5 – 1:0.1; (b) separating the forming gelatinous precipitate of the phosphorus oxyacid salt of the metal of Group IV b from the mother liquor by filtration; (c) (i) converting the obtained filter cake to a fluid sol by means of shear agitation and then scattering the sol into a heating atmosphere to form a granular gel of the phosphorus oxyacid salt of the metal of Group IV b having a water content of less than 45% or (ii) drying the obtained filter cake to such an extent that the dried cake has a water content of less than 60% but still remains a thixotropic property, then pelletizing the dried cake to form a granular gel of the phosphorus oxyacid salt of the metal of Group IV b and, when the water content of the resulting granular gel is higher than 45%, drying the pelletized product until the water content is reduced to less than 45%, the said granular gel having such a property that when it is added in an amount of 5% by weight to an aqueous solution of sulfuric acid having a concentration of 20g/100ml and the mixture is boiled for 10 minutes, the solubility of the Group IV b metal component is less than 0.5%; and (d) extracting the granular gel of the phosphorus oxyacid salt of the metal of Group IV b with an acid or its vapor in the presence of water to thereby remove the metallic impurities therefrom.

The invention will be now explained in detail. Although explanations refer mainly to the case of titanium, the process of this invention may be practiced similarly in the cases of other metals of Group IV b, namely, zirconium, hafnium and thorium.

Starting materials of components of metals of Group IV b:-

In this invention any compounds of metals of Group IV b may be used as starting materials of Group IV be metal components, so far as they are capable of reacting with phosphorus oxyacids. As such starting materials there may be cited Group IV b metal salts per se, reactive oxides and hydroxides of metals of Group IV b, solution of compounds of metals of Group IV b in organic and inorganic acids (exclusive of phosphorus oxyacids) and aqueous solutions of compounds of metals of Group IV b. Of these starting materials, any of industrially available ones contains substantial amounts of metallic impurities such as Fe, Mo, V, Co, Cr and Mn. In accordance with the process of this invention substantially pur phosphorus oxyacid salts of metals of Group IV b can be prepared from any of these starting materials.

It is sometimes preferable that the starting materials of components of metals of Group IV b are in the form of a solution, so that the reaction with the phosphorus oxyacid may be practiced uniformly and a major portion of the metallic impurities in the starting materials may be left in the mother liquor. Such solutions can be obtained by eluting the metals of Group IV b contained in salts and oxides thereof or various ores containing such metals, in an inorganic acid other than a phosphorus oxyacid, an organic acid or an aqueous solution of such acid.

Any titaniferous ore such as ilmenite, iron sand slag, rutile and high titanium slag may be used so far as it contains titanium. As titanium salts there may be used any gaseous or liquid titanium salt such as titanium tetrachloride and any acid soluble titanium salt such as titanyl sulfate and titanium hydroxide. As the starting material of titanium there may be also used, reactive titanium oxides. The main constituents of the titanium-containing ores are as follows:

Table 1

| Ore | Main Constituents | |
| --- | --- | --- |
| Ilmenite | $TiO_2$ | 40 – 60% |
| | FeO | 9 – 40% |
| | $Fe_2O_2$ | 7 – 25% |
| | $SiO_2$ | not appreciable |
| | $V_2O_5$ | 0.01 – 0.6% |

Table 1-Continued

| Ore | Main Constituents | |
| --- | --- | --- |
| Iron sand slag | $TiO_2$ | 20 – 35% |
| | $SiO_2$ | 20 – 25% |
| | CaO | 20 – 25% |
| | $Fe_2O_3$ | 2 – 6% |
| | $V_2O_5$ | 0.6 – 0.01% |
| Rutile | $TiO_2$ | 94 – 98% |
| | $Fe_2O_3$ | 0.5 – 2% |
| | $SiO_2$ | 1 – 2% |
| High-titanium slag | $TiO_2$ | 70 – 80% |
| | FeO | 7 – 10% |
| | $SiO_2$ | not appreciable |

Besides the titanium compounds, these ores contain iron, silicate and calcium components, and minor amounts of other metallic impurities such as Mo, V, Co, Cr and Mn. For the purpose of this specification, the term "metallic impurities" refers to components producing undesired colors in the products.

In this invention, such titanium-containing ore or titanium salt is treated with an organic or inorganic acid capable of dissolving the ore or salt or an aqueous solution of such acid, thus forming an acid solution of the titanium compound. Examples of useful acids for dissolving the titanium compounds are inorganic acids such as sulfuric, sulfurous, hydrochloric, perchloric, chloric and nitric acid, and organic acids such as oxalic, formic and methanesulphonic acids.

The concentration of the acid employed for preparation of the starting solution is not critical, any concentration at which the titanium in the titanium ore or titanium salt can be dissolved being useful. It can be readily empirically determined, in accordance with the type of the ore or titanium salt employed. For example, when sulfuric acid is used in extracting iron sand slag, its concentration may be 5–98%, particularly 5–40%, and when extracting ilmenite, rutile and high-titanium slag, 20–98%. When an organic acid such as oxalic acid and methanesulfonic acid is used, a 5–90% aqueous solution may dissolve the titanium component contained in iron sand slag or ilmenite. When the titanium ore or salt is dissolved in such an acid the titanium compounds are extracted into the acid or aqueous solution thereof in the form of a salt with the acid radical of the acid employed, and metallic impurities such as iron and minor amounts of V, Mo, Co, Cr and Mn are simultaneously extracted. In this invention, these solutions may be used for the reaction with a phosphorus oxyacid or its reactive derivative as they are in the as-obtained state or after purification of them.

In this invention it is also possible to use a gaseous or liquid titanium salt such as titanium tetrachloride, an acid-soluble titanium salt such as titanyl sulfate and titanium hydroxide or an amorphous titanium oxides directly as the starting material of the titanium component.

Amorphous titanium oxides may be obtained through hydrolysis or neutralization of the above-mentioned aqueous acid solution of a titanium compound. The hydrolysis or neutralization may be performed either.

1. by heating the aqueous acid solution under atmospheric or superatmospheric pressure to the temperatures below the critical point of the solution, preferably 60°–140°C., or
2. by neutralizing a part or whole of the free and combined acid in the aqueous acid solution with alkali, or 3. by diluting the aqueous acid solution with water or steam, which may be hot water.

These titanium oxides are amorphous in terms of X-ray diffractiometry.

As zirconium-containing starting materials there may be used acid solutions of zirconium-containing compounds obtained by dissolving concentrations of zirconium ores such as zircon sand ($ZrO_2.SiO_2$) and baddellyite ($ZrO_2$) in a mineral acid such as sulfuric acid, hydrochloric acid and nitric acid. If necessary, the zirconium concentrations may be glassified by melting them together with alkali and the like prior to preparation of acid solutions. Zirconium chlorides obtained by heating a zirconium ore in the presence of a carbonaceous material such as coke and blowing in chlorine thereto, namely zirconium chlorides obtained at the intermediate stage of a so-called "Kroll method", may be directly used as starting materials. Still further, zirconium hydroxides obtained by hydrolyzing acid extractions of zirconium ores in a manner as described above may be used as starting materials.

As thorium-containing starting materials there may be used thorium extractions obtained by treating concentrations of monazite, thorite and thorianite with an acid such as sulfuric acid, hydrochloric acid and nitric acid or an aqueous solution thereof in accordance with a method known per se. Of course, refined thorium oxalate, thorium hydroxide and thorium nitrate obtained during the treatment of thorium ores may be used without causing any disadvantages. Phosphorus oxyacid starting materials:

As the phosphorus oxyacid or its reactive derivative to be reacted with the above-mentioned compound of a metal of Group IV b there may be used any phosphorus oxyacid such as orthophosphoric acid ($H_3PO_4$), metaphosphoric acid ($HPO_3$), phosphorous acid ($H_3PO_3$), hypophosphorous acid ($H_3PO_2$) and polyphosphoric acids, e.g., pyrophosphoric acid ($H_4P_2O_7$), hexametaphosphoric acid [$(HPO_3)_6$] and tripolyphosphoric acid ($H_5P_3O_{10}$); anhydrides of phosphorus oxyacids such as phosphorus pentoxide; halides of phosphorus oxyacids; oxyhalides of phosphorus oxyacids; alkali metal salts (such as sodium and potassium salts) of phosphorus oxyacids; alkaline earth metal salts of phosphorus oxyacids; and ammonium, zinc and aluminium salts of phosphorus oxyacids. These phosphorus oxyacids and reactive derivatives thereof need not be of high purity, but may be a crude acid containing impurities such as Fe, Al, Mg, Ca and V, since such metallic impurities are all removable in the extraction step. Any derivative of a phosphorus oxyacid that can react with a compound of a metal of Group IV b under reaction conditions may be used. Thus, in accordance with the invention, not only water-soluble salts but also water-insoluble salts such as ore of phosphorus can be used. Of course, in case which water-insoluble salts are used, it is essential to conduct the reaction between the water-insoluble salts and compounds of metals of Group IV b in the presence of a free acid.

In this invention, it is also possible to form the phosphorus oxyacid or its derivative in situ in the reaction system.

Formation of phosphorus oxyacid salts of metals of Group IV b:

In this invention, a phosphorus oxyacid salt of a metal of Group IV b is formed by reacting the above-mentioned compound of a metal of Group IV b with a phosphorus oxyacid or its derivative at a molar ratio expressed in terms of $MO_2:P_2O_5$ (in which M is the metal of Group IV b) of 1:1.5–1:0.1. When the molar ratio of $P_2O_5$ to $MO_2$ is greater than 1.5, the phosphorus oxyacid component tends to be eliminated at the extraction, while at a $P_2O_5$ to $MO_2$ molar ratio of less than 0.1, smooth formation of a gel of the phosphorus oxyacid salt of the metal of Group IV b is hindered and extraction of metallic impurities is difficult. In this invention, it is especially preferred to conduct the reaction at a molar ratio of $MO_2:P_2O_5$ of 1:1.2 – 1:0.2.

Reaction conditions may be varied depending on the kinds of the compound of a metal of Group IV b and the phosphorus oxyacid compound to be used. For instance, in case an acid solution of a compound of a metal of Group IV b or a salt of a metal of Group IV b is used as the compound of a metal of Group IV b, the Group IV b metal component is mixed with the phosphorus oxyacid component in such proportion that the concentration of $MO_2$ in the reaction system is less than 10 weight%, especially less than 4 weight%. It is preferred to conduct the mixing in the presence of water. In case a derivative of a phosphorus oxyacid is used, it is desired to make a free acid present in the reaction system. In conducting the above reaction in accordance with this invention, the presence of a free acid in an amount of about 30% in the reaction system does not cause any disadvantage. The reaction temperature is not particularly critical, but it is preferred to effect the reaction at a temperature of 30°–80°C., especially 50°–70°C. Under the above-mentioned reaction conditions a phosphorus oxyacid salt of a metal of Group IV b is formed as gelatinous precipitate, which can be easily separated from the mother liquor containing the metallic impurities and free acid by filtration. Namely, the phosphorus oxyacid salt of a metal of Group IV b obtained under the above-mentioned reaction conditions can be easily separated by filtration.

As the so formed phosphorus oxyacid of a metal of Group IV b is a selective absorbent for ions, complexes and salts, the gel sometimes includes metallic impurities contained in starting materials such as vanadium, aluminum, iron and manganese depending on the reaction conditions. On the other hand, the mother liquor contains silica sol and such metallic impurities as magnesium, calcium, iron and aluminum which have been separated without being contained in the gel.

In conducting the above reaction, it is possible to oxidize or reduce the solution of the Group IV b metal component in advance. For instance, in the case of the ilmenite extraction, when its acid solution is reduced in advance by addition of a metal such as Fe, Al, Zn and Sn, it is possible to remain in the mother liquor a substantial amount of the iron component contained in the titanium solution. In the case of the iron sand slag extraction, a major part of the vanadium component can be contained in the precipitated gel by keeping at least 3% of the whole titanium component in the trivalent titanium state. It is also possible to coprecipitate iron and vanadium by treating the titanium extraction with hydrogen peroxide in advance.

In the above-mentioned embodiment of this invention, it is possible to remove greater parts of undesirable components such as iron component contained in the Group IV b metal component such as titanium component at this stage of the reaction by selecting suitable reaction conditions.

In accordance with this invention, the free acid remaining in the mother liquor is used repeatedly for dissolving the Group IV b metal component, and it is possible to return the acid radical combined with the Group IV b metal component into the mother liquor by the reaction with the phosphorus oxyacid component. Accordingly, this invention is advantageous in that acids are not lost during the process.

The so formed gelatinous precipitate of the phosphorus oxyacid salt of a metal of Group IV b is filtered and separated from the mother liquor by a method known per se. The separated filter cake may be washed with water in order to remove the free acid and impurities attached to the cake. The so obtained filter cake contains generally 65–85% of water.

In a preferable embodiment of this invention, the amount of the free acid in the end gel of the form of a small mass is adjusted to less than 20%, preferably less than 10%, based on the water content of the said gel of the form of a small mass, by washing the filter cake separated from the mother liquor with water or by neutralizing the filter cake with a base such as ammonia, urea, alkali metal hydroxide, alkali metal carbonate, alkaline earth metal hydroxide and, if necessary, washing the neutralized product with water. Formation and stabilization of the gelatinous small masses:-

In accordance with the process of this invention, the so obtained filter cake of the gel of the phosphorus oxyacid salt of a metal of Group IV b is molded into homogeneous small masses i. by converting the gel to a fluid sol by means of shear agitation and scattering the sol into a heating atmosphere to thereby form a granular gel of the phosphorus oxyacid salt of a metal of Group IV b having a water content of less than 45%, preferably less than 35%; or ii. by drying the filter cake to such an extent that the dried cake has a water content of less than 60%, preferably less than 55% but it still retains a thioxotropic property, pelletizing the dried cake and, when the water content of the pelletized gel is higher than 45%, drying it until the water content is less than 45%, to thereby form a granular gel of the phosphorus oxyacid salt of a metal of Group IV b.

The so formed small masses are stabilized against an action of an acid to such an extent that when they are added in an amount of 5 weight% to an aqueous solution of sulfuric acid having a concentration of 20g/100 ml, the solubility of the Group IV b metal component is less than 0.5%.

Metallic impurities such as Fe and V are still contained in the gel formed by the reaction between the Group IV b metal component and the phosphorus oxyacid component. It is difficult to remove substantially these metallic impurities merely by treating the gel in water or a dilute aqueous acid solution. Further, even when the above gelatinous precipitate is extracted with a relatively concentrated aqueous acid solution as it is or after it is molded into small masses, the resulting product tends to crumble easily and the phosphorus oxyacid salt of the metal of Group IV b, particularly the phosphorus oxyacid component, is easily eluted in the aqueous acid solution.

On the other hand, in this invention the filter cake composed of the gel of the phosphorus oxyacid has a great thixotropic property and can be easily made fluid under shear agitation. Accordingly, when the filter cake is converted directly to a fluid sol by means of shear agitation and the sol is scattered into a heating atmosphere to thereby form a granular gel of a small water content, or when the filter cake is dried to such an extent that the water content is reduced to less than 60% but the dried product still remains a thixoptropic property and the dried product is pelletized and, if necessary, dried again; there can be obtained small masses of the homogeneous gel of the phosphorus oxyacid of the metal of Group IV b which hardly tend to crumble and are highly stabilized against an action of an acid.

In a preferable embodiment of this invention, the direct conversion of the filter cake to a fluid sol under shear agitation is performed by throwing the filter cake into a mixer equipped with rotary vanes rotating at 1000–4000 r.p.m. Thus, there is formed a homogeneous sol rich in flowability. When the so formed sol is sprayed into a heating atmosphere maintained at 100°–500°C., preferably 140°–250°C. or dropped onto a rotating disc plate to which hot air maintained at the above temperature is blown, there is formed a granular gel having a water content of less than 45%, preferably less than 35%.

In another preferable embodiment of this invention, the above-mentioned filter cake is dried to such an extent that the water content of the dried cake is less than 60%, preferably less than 55% but is high enough for the dried cake to still retain a thixotropic property, namely, generally at least 35%, preferably at least 40%. Then, the dried filter cake is pelletized by means of a pelleter or a kneading granulator. In this case, it is generally preferred to heat the resulting pellet at 30°–500°C. to thereby adjust the water content of the pellet to 18–45%, preferably 20–35%.

In this invention, it is essential that the stabilization of the gel of the phosphorus oxyacid of a metal of Group IV b against an action of an acid should be effected under such conditions that the water content of the resulting gel is less than 45%, particularly less than 35% and any free acid is not present in the resulting gel substantially. When a substantial amount of a free acid is present in the resulting gel, small masses of the gel break down and crumble during the extraction of the metallic impurities and the phosphorus oxyacid salt of a metal of Group IV b tends to elute out.

Thus, in accordance with this invention, the gelatinous precipitate of the phosphorus oxyacid salt of a metal of Group IV b is separated from the mother liquor containing the free acid by optional solid-liquid separating means such as centrifugal separation, filtration and decantation. Then, the so separated filter cake is subjected to the above-mentioned stabilizing treatment, if necessary, after it is washed with water.

In this invention it is preferable that the content of the free acid in the granular gel is less than 20%, especially less than 10%, based on the water contained in the gel.

The granular gel of the phosphorus oxyacid salt of a metal of Group IV b which does not break down or crumple at the extraction and is stabilized against an action of an acid can be obtained by drying the gel of the phosphorus oxyacid salt of a metal of Group IV b to such an extent that the water content of the dried gel is less than 45%, particularly less than 35%. We assume that the reason for the above may be that when the gel of the phosphorus oxyacid salt of a metal of Group IV b is dried in the above-mentioned manner, polymerization of said salt per se or condensation of the Group IV b metal component in said salt with the phosphorus oxyacid component is caused to occur, forming giant molecules of the phosphorus oxyacid salt of the metal of Group IV b, with the consequence that the gel is made insoluble in a relatively highly concentrated acid.

In case the gel of the phosphorus oxyacid salt of a metal of Group IV b is a gel of zirconium phosphate, it can be molded into small masses by subjecting the filter cake to an action of a pelleter or a kneading granulator. The resulting small masses are dried until the water content of the gel is less than 45%, preferably less than 35%. In this case, it is important to conduct the drying such that a substantial amount of the free acid will not be incorporated into the gel.

Extraction of metallic impurities:-

In accordance with this invention, the above-mentioned stabilized gel of the phosphorus oxyacid salt of a metal of Group IV b is extracted with an acid or its vapor in the presence of water to remove the metallic impurities therefrom. As the acid there may be used organic and inorganic acids and aqueous solutions thereof. For example, any inorganic acid such as hydrochloric, sulfuric or nitric acid, or any organic acid such as oxalic, acetic, formic, organic sulfonic, or organic phosphonic acid can be used. In this invention it is possible to use, in combination with such acid, a soluble complex-forming agent which cannot form a soluble complex with a metal of Group IV b but with metallic impurities contained in the phosphorus oxyacid salt of a metal of Group IV b. Examples of such complexforming agent are tributylphosphate, ethylenediaminetetraacetic acid (EDTA), oxycarboxylic acid, thioglycolic acid and nitrilotriacetic acid. It is also possible to heighten the extraction efficiency with the use of an oxidant or reducing agent in combination with the acid. In accordance with this invention, even when the extraction is effected by employing such a concentrated acid as capable of removing metallic impurities from the phosphorus oxyacid salt of a metal of Group IV b, such as Fe and V to such an extent that the presence of the metallic impurities would not be appreciable by emission spectro-analysis, the loss of the phosphorus oxyacid salt of a metal of Group IV b due to the elution thereof can be substantially completely prevented. For instance, hydrochloric acid of a concentration of 2N to 13.3N or sulfuric acid having a concentration of 10–50g/100 ml can be used in this invention.

In accordance with this invention it is possible to use these acids in the vapor form. For instance, in case a volatile acid such as hydrochloric acid is used, the metallic impurities are extracted and removed by contacting the phosphorus oxyacid salts of a metal of Group IV b with a vapor of the acid.

The temperature adopted at the extraction varies depending on the kinds of the phosphorus oxyacid salt and the extracting acid. For instance, in the case of hydrochloric acid, a temperature of at least 40°C. is preferred, and particularly, when the extraction is effected at a temperature of 50° to 150°C., metallic impurities such as V and Fe can be removed efficiently. In the case of sulfuric acid, metallic impurities contained in the phosphorus oxyacid salt of a metal of Group IV b can be efficiently removed by conducting the extraction at temperatures ranging from room temperature to 90°C.

The extraction operation may be performed by employing any of extraction means known in the art. For instance, a mixer settler, a fixed bed type or moving bed type liquidsolid extraction apparatus utilizing a packed layer, a continuous, horizontally rotating extraction apparatus and a filter press type dializing apparatus may be used for the extraction and removal of metallic impurities. It is also possible to adopt a multi-staged extraction method in which a preliminary extraction is effected with the use of a relatively dilute acid and then a relatively concentrated acid is employed.

In a preferable embodiment of this invention, hydrochloric acid is used as the extraction medium and the extracted liquor containing metallic impurities, as it is or after absorbed in a solid, inorganic absorbent, is distilled, with gasified pure hydrochloric acid free of metallic impurities being recycled to the phosphorus oxyacid salt of a metal of Group IV b. Thus, in accordance with this embodiment there can be attained such advantages that metallic impurities such as Fe and V can be separated and removed for a short period of time and the metallic impurities can be recovered in the highly concentrated state. Further, in this embodiment it is possible to separate and recover hydrochloric acid and water remaining in the phosphorus oxyacid salt of a metal of Group IV b by conducting the heating in a closed circuit, with the result that any waste acid or waste water harmful to public health is not formed as by-product at the purification step. Hydrochloric acid remaining in the refined phosphorus oxyacid salt of a metal of Group IV b can be easily eliminated by heating or water-washing.

Post-treatments:-

The gel of the phosphorus oxyacid salt of a metal of Group IV b from which substantially all the metallic impurities have been removed by the above-mentioned procedures may be optionally subjected to post-treatments such as water-washing and drying, and thereafter they may be broken into particles of a desired size. Thus, there is obtained an end product.

Further, crystals of the phosphorus oxyacid salt of a metal of Group IV b can be obtained by calcining the abovementioned gel of the phosphorus oxyacid salt of a metal of Group IV b at a temperature 500°–1100°C., especially 700°–900°C. These crystals may be used as end product as they are or after they are crushed by a dry or wet method. In this case, the proportion of the Group IV b metal component and the phosphorus oxyacid component can be maintained within a preferable range by further reacting the phosphorus oxyacid salt of a metal of Group IV b with a phosphorus oxyacid.

An embodiment of the process of this invention will be now explained by referring to a flow sheet given in the accompanying drawing.

A solution of crude titanium sulfate obtained by extraction of a starting material of the titanium component such as iron sand slag or ilmenite with sulfuric acid and crude phosphoric acid solution obtained by treating a starting material of the phosphoric acid component such as phosphate rock are continuously poured into a continuous reaction tank. The resulting slurry of the titanium phosphate gel is withdrawn from the reaction tank and fed to a vacuum filter where the titanium phosphate gel is separated from the mother liquor containing sulfuric acid, silica sol, iron salts, magnesium salts, etc. and then the separated gel is washed with water according to need. During this step major portions of impurities such as iron salts, magnesium salts and silica contained in the starting materials are eliminated while greater portions of metallic impurities such as vanadium and aluminum contained in the starting materials accompany the titanium phosphate gel. The filter cake of the titanium phosphate gel is then forwarded to a drier where it is dried to such an extent that the dried gel has water content of less than 45%, preferably 35% but it still retains a thixotropic property. Then, the dried gel is introduced into a granulator where it is pelletized to particles of a size of about 0.5 to 7 mm.

The pelletized gel of titanium phosphate is then forwarded to an extraction column equipped with a perforated plate at its bottom where it is dipped in an aqueous hydrochloric acid solution of a concentration of 10 to 25%. The extracted liquor withdrawn from the lower portion of the perforated plate via a pipe 1 is fed to a tank for concentrating waste hydrochloric acid. Hydrochloric acid vapor formed in the concentrating tank is fed to the extraction column via a pipe 2 and blown into the hydrochloric acid solution in the extraction column, whereby the temperature of the hydrochloric acid in the extraction column can be maintained at 80°–110°C. Thus, the hydrochloric acid containing metallic impurities is passed through the concentrating tank and can be recycled to the extraction column in a pure form. The metallic impurities contained in the extraction liquor are gradually concentrated in the concentrating tank.

When the extraction of the metallic impurities is completed, the hydrochloric acid solution is all withdrawn from the pipe 2 and hot air is fed to the extraction column from a hot air-forming furnace through a pipe 3. Thus, the hydrochloric acid in the titanium phosphate gel is gasified and condensed in a pure hydrochloric acid tank via a pipe 4.

Thus, the metallic impurities can be substantially removed and there can be obtained a substantially pure titanium phosphate gel free of any hydrochloric acid component. Further, in the above operation, water contained in the titanium phosphate gel can be also removed efficienctly. Accordingly, handling of the resulting titanium phosphate is very easy. For instance, the gel can be easily forwarded to a calcination furnace by a pneumatic conveyor or the like. The titanium phosphate gel is calcined at 200°–1000°C. for 0.5–5 hours and then it may be optionally crushed or ground according to need. Thus, an end product of titanium phosphate is obtained.

In the concentrating tank the waste liquor is concentrated until the concentration of the metallic impurities is about 10–20%, and it is fed via a pipe 5 to a store tank or another concentration tank. Then, it may be optionally further concentrated according to need, and thereafter useful metallic components such as vanadium and aluminum are recovered from the waste liquor by a method known per se.

According to the above-mentioned embodiment, the extraction of metallic impurities from titanium phosphate or zirconium phosphate and the removal of hydrochloric acid from the phosphate can be effected completely in a closed circuit and further without using any washing water. Accordingly, any waste acid or waste liquid is not formed. Further, any particular heat source is not necessary for the extraction of metallic impurities from titanium phosphate or zirconium phosphate, and the latent and sensible heats given to hydrochloric acid vapor at the concentration of the waste hydrochloric acid are efficiently utilized for the extraction. Consequently, the structure of the extraction apparatus can be extremely simplified. Still further, the hydrochloric acid component contained in the titanium phosphate gel can be removed very easily, while an extremely great amount of washing water is generally necessary for removing such hydrochloric acid component, and pure titanium phosphate gel can be recovered in the pneumatically conveyable state. Still in addition, in accordance with the above embodiment of this invention, useful metallic components such as vanadium and aluminum contained in the titanium phosphate can be recovered at such a high yield as exceeding 95%.

The process of this invention is applied extremely advantageously to the industrial purification of industrially available crude starting materials of titanium, zirconium or thorium. Further, titanium or zirconium salts of phosphorus oxyacids obtained according to the process of this invention are substantially free of coloring impurities, and are particularly excellent in reflectivity of rays of light, particularly ultra-violet rays. Accordingly, such salts are particularly useful as white pigment and filler. Still further, as these salts are also excellent in rust-preventing property and flame resistance, they may be used conveniently as rust-preventing pigment and flame-resistant filler. Still in addition, titanium or zirconium salts of phosphorus oxyacids obtained by the process of this invention, particularly those of a granular form, are excellent in heat resistance. Accordingly, they are useful also as inorganic ion exchanger, or catalyst or catalyst carrier. Still further, these gels of phosphorus oxyacid salts can be converted to pure titanium oxides, zirconium oxides, titanium halides, zirconium halides and organic titanium or zirconium compounds by methods known per se. Accordingly, they are also useful as starting materials of these compounds.

Phosphorus oxyacid salts of a metal of Group IV b obtained according to this invention are so purified that an alkali metal salt of a phosphorus oxyacid and phosphorus formed as by-products at the preparation of oxides or halides of metals of Group IV b from such purified phosphorus oxyacid salts can be recovered also in pure forms. This is also one of advantages of this invention.

Thorium salts of phosphorus oxyacids obtained according to the process of this invention are substantially free from metallic impurities. Therefore, they are conveniently used as ceramic materials and fuels for nuclear reactors.

The invention will be now explained in detail by referring to examples.

EXAMPLE 1

In this Example, the preparation of substantially pure titanium phosphate is explained.

A. Preparation of a gel of titanium phosphate:

As the starting material of the titanium component of titanium phosphate is selected a solution of a titanium salt in sulfuric acid obtained by treating ilmenite powder with sulfuric acid.

As the ilmenite powder is selected a powdery product capable of passing through a 300-mesh sieve produced in U.S.S.R. The composition of the starting ilmenite powder is as follows:

| | |
|---|---|
| $TiO_2$ | 51.6% by weight |
| $V_2O_5$ | 0.18% by weight |
| FeO | 41.4% by weight |
| $Fe_2O_3$ | 1.12% by weight |
| $Al_2O_3$ | 0.70% by weight |
| MgO | 3.20% by weight |
| $SiO_2$ | 0.56% by weight |
| CaO | 0.50% by weight. |

The ilmenite powder (1 kg) is admixed with about 500 ml of water to form a slurry. Then, 1.2 kg of concentrated sulfuric acid is added to the slurry and the mixture is heated for 2 hours at a maximum temperature of 140°C. After the reaction, the titanium component is extracted in the form of titanium sulfate and the extraction liquor is reduced and cooled to isolate the iron component in the form of crystals of $FeSO_4 \cdot 7H_2O$, followed by removal thereof. The resulting sulfuric acid solution of the titanium salt has the following composition:

| | |
|---|---|
| $TiO_2$ | 25.2 g/100 ml |
| $V_2O_5$ | 0.85 g/100 ml |
| FeO | 12.4 g/100 ml |
| $Al_2O_3$ | 0.32 g/100 ml |
| MgO | 1.4 g/100 ml |
| Free sulfuric acid ($H_2SO_4$) | 18.4 g/100 ml |

As the starting material of the phosphorus component of titanium phosphate is selected a crude phosphoric acid obtained by treating phosphate rock powder with sulfuric acid.

As the phosphate rock powder is selected a powdery product capable of passing through a 300-mesh sieve produced in Kola, U.S.S.R. The starting rock has the following composition:

| | |
|---|---|
| $P_2O_5$ | 38.7% by weight |
| CaO | 51.4% by weight |
| $Fe_2O_3 + Al_2O_3$ | 0.43% by weight |
| $Na_2O + Al_2O_3$ | 0.29% by weight |
| $SiO_2$ | 1.02% by weight |
| F | 3.36% by weight |

The powder of phosphate rock produced in Kola, U.S.S.R. is decomposed with sulfuric acid by a conventional wet method to recover a crude phosphoric acid having a specific gravity of 1.72 (20°C.) and the following composition:

| | |
|---|---|
| $P_2O_5$ | 58.5% by weight |
| CaO | 0.15% by weight |
| MgO | 0.50% by weight |
| $Fe_2O_3$ | 1.05% by weight |
| $Al_2O_3$ | 0.65% by weight |
| F | 0.35% by weight |
| $SiO_2$ | 0.05% by weight |
| $Na_2O + K_2O$ | 1.40% by weight |
| Free sulfuric acid ($H_2SO_4$) | 4.5% by weight |

The formation of a gel of titanium phosphate is performed in the following manner.

A 5-liter capacity beaker is charged with 3 liters of water and maintained at 60°C. by heating. At first 230 ml of the above-mentioned crude phosphoric acid is added, and then 1.5 liters of the above-mentioned sulfuric acid solution of the titanium salt is gradually added over a period of time of about 30 minutes. Then, the system is heated and stirred to complete formation of a gelatinous precipitate of titanium phosphate. At this time the molar ratio of the titanium salt to the crude phosphoric acid (reckoned as $TiO_2:P_2O_5$ molar ratio) is adjusted to 3:1. After precipitation of the titanium phosphate gel has been done sufficiently, the resulting precipitate of the titanium phosphate gel is filtered by means of a vacuum filter. Thus, there are recovered a filter cake of the gel of titanium phosphate on one hand and waste sulfuric acid on the other, which contains as main components free sulfuric acid, bound sulfuric acid released from the titanium salt by addition of phosphoric acid, iron sulfate, magnesium sulfate and silica sol. From the recovered waste sulfuric acid are separated the silica sol, iron sulfate and magnesium sulfate by means of crystallization separation and the like. Thus, the waste sulfuric acid can be recycled to the reaction after such impurities have been removed therefrom. The filter cake of titanium phosphate is washed 4 times with warm water maintained at about 80°C. by employing a vacuum filter. Thus, there is recovered a plate-like cake of the gel of titanium phosphate from which greater parts of free sulphuric acid, iron sulfate, magnesium sulphate, silica sol and other impurities not adsorbed in titanium phosphate have been removed. The water content of the cake is measured to be 69.0%, and the $TiO_2:P_2O_5$ molar ratio is determined to be about 3:1. By the determination of the recovered waste sulfuric acid it is confirmed that the titanium component is contained in an amount of 0.005% reckoned as $TiO_2$ and the phosphorus component is contained in an amount of 0.01% reckoned as $P_2O_5$. Accordingly, it can be seen that substantially all of the titanium component and phosphorus component contained in the starting materials are fixed in the form of a cake of titanium phosphate.

B. Granulation and stabilization of the titanium phosphate cake:

When the above titanium phosphate plate-like cake is stirred in the absence of water by means of a high-speed rotating mixer (rotating rate of 2000 r.p.m.), the plate-like cake is converted to a fluid sol, and there is obtained mayonnaiselike titanium phosphate.

The so formed fluid sol of titanium phosphate, is fed to a cylindrical, counter-current spray drier column, from the top of which hot air maintained at 200°C. is blown. In this drier column, the mayonnaise-like titanium phosphate is molded into small masses and at the same time the condensation aging of titanium phosphate is accomplished by dried hot air of 200°C. to stabilize the titanium phosphate.

The solubility of the so formed small masses of the stabilized titanium phosphate gel is measured by a method comprising charging into an aqueous solution of sulfuric acid of a concentration of 20 g/100 ml the titanium phosphate in an amount of 5% by weight based on the solution, boiling the mixture for 10 minutes and determining the titanium component (reckoned as $TiO_2$) contained in the supernatant liquor. (In the specification, the solubility test is conducted in accordance with this method.) For comparison, the solubility of the unstabilized titanium phosphate gel described in (A) is also measured. In accordance with the above-mentioned test method, the solubility (%) of the phosphorus component is also measured with respect to either the stabilized titanium phosphate or the unstabilized gel described in (A). Results of these tests are shown in Table 2. From the results it can be seen that when a titanium phosphate paste is sprayed into dried hot air of 200°C. in a manner as described in this Example, the titanium phosphate is highly stabilized and made insoluble in a concentrated acid, and that particularly the loss of the phosphorus component is very low in the so stabilized titanium phosphate as compared with the unstabilized gel described in (A).

The water content of the stabilized titanium phosphate is 24.0%.

C. Extraction of metallic impurities from small masses of the stabilized titanium phosphate gel:

Although greater portions of metallic impurities contained in the starting ilmenite and phosphate rock have been removed in the manner described in (A) by the treatment with warm water at the formation of the titanium phosphate cake, the above-mentioned stabilized titanium phosphate gel still contains metallic impurities in the form of sulfates in amounts damaging the color hue of titanium phosphate, such as iron components contained in the unwashed portion and impurities adsorbed in the titanium phosphate by the selective adsorbing property thereof, for instance, vanadium and aluminum components. Accordingly, the granular stabilized titanium phosphate takes a greenish brown color, and when it is calcined as it is, there is obtained a dirty product of a brownish yellow color.

In order to remove such metallic impurities damaging the color hue of the titanium phosphate, the extraction of these metallic impurities is effected by using a 6N aqueous hydrochloric acid solution heated at 80°C. as an extraction medium. As the extraction apparatus there is used a heat-resistant glass cylinder of a 4 cm inner diameter and a 15 cm length, in the lower portion of which is a perforated plate is provided. A jacket is mounted to heat the extraction column from the outside by means of warm water. In the upper portion of the extraction column, a heating device and a feeding device are disposed to heat the extraction medium and to feed the extraction medium into the extraction column at a prescribed rate. In the lower portion of the extraction column there are disposed a cooling device for cooling the extraction liquor and a device for recovering the extraction liquor.

Small masses of the greenish brown, stabilized titanium phosphate gel (50 g) is charged into the extraction column, and the outside of the extraction column is heated by warm water maintained at 90°–95°C. In the device for heating the extraction medium disposed in the upper portion of the extraction column the extraction medium consisting of a 6N aqueous hydrochloric acid solution is heated at about 95°C., and then the extraction medium is fed at a rate of 5 ml/min. The primarily recovered extraction liquor (150 ml) contains iron and vanadium components as main extracted matter. In the second recovery liquor (150 ml), the main extracted matter consists predominantly of the iron component. In the third hydrochloric acid recovery liquor (150 ml) the presence of metallic impurities, particularly vanadium and iron components cannot be detected. Thus, there are obtained pure white small masses of titanium phosphate, and the extraction of the metallic impurities from titanium phosphate is accomplished.

Next, the cooling device and recovery device disposed in the lower portion of the extraction column are dismantled, and a hot air-forming apparatus is appended to the extraction column, whereby hot air maintained at about 150°–250°C. is blown from the lower portion of the extraction column and the extracted titanium phosphate is allowed to contact the hot air. Thus, the aqueous hydrochloric acid contained in the titanium phosphate at the completion of the extraction is discharged from the outer portion of the extraction column together with the hot air and recovered, and at the same time the small masses of the titanium phosphate are dried by the hot air. By the above-mentioned operation there is obtained dried white titanium phosphate substantially free of metallic impurities in the form of small masses whose subsequent handling is very easy.

From the description given above it is seen that since in accordance with the process of this invention complicated operations are not required and any waste water causing various troubles to the public health is not discharged at all, the process of this invention is very advantageous over the conventional method of washing a titanium phosphate gel with an acid in which a trouble some operation should be performed for removing the acid component by water-washing from the titanium phosphate gel from which metallic impurities have been removed by the acid-washing, and a great amount of water is required for accomplishing the above operation, which results in discharge of a great amount of waste water.

Each of the titanium component and phosphorus component is eluted in the 6N hydrochloric acid solution only in a very small amount at the above extraction step. The loss ratio (%) of each component is less than 0.4%. (The value of the loss ratio is of an elution ratio (%) of the amount of the component eluted in the extraction medium to the amount of the component contained in the starting material.) Accordingly, it can be seen that titanium phosphate substantially free of metallic impurities can be obtained at a high recovery ratio in accordance with the process of this invention.

D. Titanium phosphate product:

As a result of emission spectroanalysis of the so prepared titanium phosphate it is confirmed that the product is substantially free of metallic impurities such as vanadium, iron, manganese and chromium and it is substantially pure titanium phosphate.

After the titanium phosphate product is calcined at 800°C. and ground, the whiteness thereof is examined by measuring the refectivity according to a powder method using a plate of alumina ($Al_2O_3$) as the standard. The results are shown in Table 2.

Table 2

| | | Stabilized titanium phosphate | Wet gel of titanium phosphate before stabilization |
|---|---|---|---|
| Solubility (%) | Titanium component (as $TiO_2$) | 0.001 | 1.85 |
| | Phosphorus component (as $P_2O_5$) | 0.02 | 1.25 |

Table 2-Continued

|  | Wave-length (mμ) | Calcined titanium phosphate obtained in Example 1 | Commercially available rutile titanium oxide |
|---|---|---|---|
| Refectivity (%) | 350 | 70.0 | 6.5 |
|  | 400 | 101.0 | 36.5 |
|  | 450 | 103.0 | 95.5 |
|  | 500 | 103.5 | 95.5 |

From the results given above it can be seen that substantially pure titanium phosphate can be prepared conveniently at a high yield from starting ilmenite and phosphate rock in accordance with this invention.

EXAMPLE 2

This Example illustrates an embodiment of preparing titanium phosphate while utilizing aqueous hydrochloric acid efficiently as the extraction medium.

In the same manner as described in (A) and (B) of Example 1, small masses of a stabilized titanium phosphate containing metallic impurities are formed by preparing a filter cake of a titanium phosphate gel from ilmenite and phosphate rock, converting the cake to a fluid sol by high speed agitation by means of a mixer and spraying the sol in hot air.

The resulting greenish brown titanium phosphate gel containing metallic impurities is subjected to an extraction treatment with an extraction medium composed of a warm aqueous hydrochloric acid solution having a concentration of 20% by weight and maintained at 90°–105°C. In a closed circuit (in a sealed circulation system) while utilizing the waste hydrochloric acid efficiently, whereby metallic impurities can be substantially removed without substantial loss of either the titanium component or the phosphorus component. The extraction treatment is detailed below.

A heat-resistant glass cylinder column of a 16 cm inner diameter and a 75 cm length is used as extraction apparatus. A perforated plate is provided in the lower portion of the column.

A heating device for heating the aqueous hydrochloric acid extraction medium with hydrochloric acid vapor formed at the evaporation of the waste hydrochloric acid liquor which has been once used as the extraction medium and contains metallic impurities, and a feeding device for feeding the so warmed aqueous hydrochloric acid medium to the extraction column at a prescribed rate are mounted in the upper portion of the extraction column.

Small masses of the stabilized titanium phosphate (1 kg) is charged into the extraction column and an aqueous hydrochloric acid solution of a concentration of 20% by weight heated at 90°–105°C. by vapor of the recovered hydrochloric acid is continuously fed at a rate of 20 ml/min from the top of the extraction column.

The primarily recovered extraction liquor (2.5 l) contains mainly vanadium, aluminum and iron components, and in the second extraction liquor (3.0 l) is mainly contained the iron component. When the extraction is further effected with another 3 liters of the extraction medium, the presence of any of the vanadium, aluminum and iron components is not detected in the recovered extraction liquor. Thus, there is obtained a granular, pure white gel of titanium phosphate, and at this stage the extraction treatment is completed.

In the above extraction operation, the waste hydrochloric acid liquor containing extracted metallic impurities is concentrated by heating to recover valuable components, particularly vanadium and aluminum components, from the metallic impurities, during which the hydrochloric acid component in the waste liquor is evaporated. The so formed vapor of aqueous hydrochloric acid can be used again as extraction medium after it has been cooled. Further, when the so formed vapor is directly introduced into the aqueous hydrochloric acid extraction medium, it acts as a heating medium to the extraction medium without changing the hydrochloric acid concentration in the extraction medium. Thus, the heat concentration of the waste aqueous hydrochloric acid liquor not only attains the recovery of valuable metallic components contained in the waste liquor but also makes it possible to use the vaporized hydrochloric acid component repeatedly and efficiently together with the heat retained in the vapor.

Still further, although 0.1–0.5% of the titanium phosphate component is dissolved in the waste aqueous hydrochloric acid liquor during the extraction, such titanium phosphate component is primarily precipitated at the heat concentration of the waste liquor in the form of titanium phosphate and it can be easily separated by filtration in the form of titanium phosphate. Accordingly, in this embodiment of this invention titanium phosphate can be obtained at a high yield without substantial loss of titanium and phosphorus components.

The resulting small masses of the titanium phosphate from which the metallic impurities have been substantially removed is allowed to contact hot air maintained at about 150°–250°C. in the same manner as described in (C) of Example 1, whereby the hydrochloric acid component contained in the extracted small masses of the titanium phosphate is gasified and recovered.

The resulting dried titanium phosphate gel is calcined at 800°C. and then ground. As a result of emission spectroanalysis of the ground product it is confirmed that the presence of metallic impurities such as vanadium, iron, manganese, aluminum and chromium is hardly detected in the product and the product is substantially pure titanium phosphate. The results of the measurement of the reflectivity are shown in Table 3.

Table 3

| Wavelength (mμ) | Reflectivity (%) |
|---|---|
| 350 | 72 |
| 400 | 102 |
| 500 | 102 |
| 600 | 102 |

The waste aqueous hydrochloric acid recovered as byproduct during the treatment of small masses of the titanium phosphate with warm aqueous hydrochloric acid contains some of metallic impurities contained in the starting ilmenite and phosphate rock, such as vanadium, iron, aluminum, calcium, potassium, sodium, manganese, nickel, zinc, lead and tin. Particularly, vanadium, aluminum, potassium, sodium and manganese adsorbed in the form of sulfates in the titanium phosphate by means of its selective adsorbing property are shifted at ratios of more than 90% to the waste aqueous hydrochloric acid during the extraction with warm aqueous hydrochloric acid.

As described above, when the waste aqueous hydrochloric acid containing such metallic impurities is heated to concentrate the metallic impurities, the hydrochloric acid component is gasified, and it is efficiently reused as the extraction medium and at the same time the heat used for the concentration is retained in the aqueous hydrochloric acid vapor and used efficiently for warming the extraction medium. By the evaporation of the hydrochloric acid component, sulfates of the metallic impurities are recovered in the form of a paste in which some of the salts are precipitated and surrounded by other salts.

The resulting metallic impurities, particularly sulfates of vanadium, aluminum, potassium, sodium and manganese can be recovered in the form of valuable compounds by conventional techniques.

From the above results it can be seen that in accordance with this invention substantially pure titanium phosphate can be prepared from ilmenite and phosphate rock as starting materials by treating small masses of the stabilized titanium phosphate gel formed from said starting material with a warm aqueous hydrochloric acid extraction medium in a closed circuit.

EXAMPLE 3

This Example illustrates an embodiment of the preparation of titanium phosphate by using iron sand slag as the starting material of the titanium component.

A. Preparation of small masses of a stabilized titanium phosphate gel:

As the titanium salt solution of sulfuric acid which is the starting material of the titanium component of titanium phosphate there is selected a solution obtained by treating iron sand slag powder with sulfuric acid.

As the iron sand slag powder is used a powdery product obtained by treating iron sand in an electric furnace, grinding the resulting iron sand slag separated from iron and passing it through a 300-mesh sieve. The composition of the powder iron sand slag is as follows:

| | |
|---|---|
| $TiO_2$ | 33.2% by weight |
| $V_2O_5$ | 0.12% by weight |
| $SiO_2$ | 30.3% by weight |
| $CaO$ | 20.2% by weight |
| $Fe_2O_3$ | 4.2% by weight |
| $Al_2O_3$ | 8.2% by weight |
| $MgO$ | 6.1% by weight |
| $Cr_2O_3$ | 0.06% by weight |

The ground product iron sand slag (1 kg) is mixed with 1 liter of concentrated sulfuric acid and 2 liters of water, and the mixture is heated and boiled. The reaction is continued for about 1 hour while the boiling state is being maintained. Then, the reaction mixture is cooled and is diluted with a small amount of water, followed by separation of gypsum and silica gel formed by the reaction and the unreacted residue by filtration. Thus, a titanium salt solution of sulfuric acid having a specific gravity of 1.40 (at 20°C.) is recovered as the filtrate. The composition of the so recovered titanium solution filtrate. The composition of the so recovered titanium solution is as follows:

| | |
|---|---|
| $TiO_2$ | 8.75 g/100 ml |
| $Ti_2O_3$ | 0.15 g/100 ml |
| $V_2O_5$ | 0.032 g/100 ml |
| $Fe_2O_3$ | 1.45 g/100 ml |
| $Al_2O_3$ | 3.20 g/100 ml |
| $MgO$ | 1.32 g/100 ml |
| $Cr_2O_3$ | 0.002 g/100 ml |
| Free sulfuric acid | 1.55 g/100 ml |

As the starting material of the phosphorus component of titanium phosphate is used the same crude phosphoric acid as used in (A) of Example 1.

The reaction of forming a titanium phosphate gel is conducted in the following manner:

3 Liters of water is charged in a 5-liter capacity beaker, and 1 liter of the above-mentioned titanium salt solution of sulfuric acid and 60 ml of the crude phosphoric acid ($P_2O_5$ content being 58.5 % by weight) is added at temperatures of 60° – 70°C. The $TiO_2$:$P_2O_5$ molar ratio in the resulting mixture is about 3:1. When the mixture is agitated at 60° – 70°C., formation of a gelatinous precipitate of titanium phosphate containing metallic impurities begins, and when the agitation is continued for about 30 minutes, the reaction is completed.

The resulting titanium phosphate gel is filtered by means of a vacuum filter to separate a plate-like cake of a wet gel of titanium phosphate from the waste sulfuric acid consisting predominantly of free sulfuric acid, bound sulfuric acid released from the titanium salt by addition of phosphoric acid, iron sulfate, magnesium sulfate, silica sol and other impurities.

After silica sol and metallic impurities such as iron sulfate and magnesium sulfate are separated from the waste sufuric acid by crystallization separation or other means, it can be reused for the reaction.

The filter cake is washed four times with warm water maintained at 70° – 80°C. Thus, a greater part of free sulfuric acid and impurities not adsorbed in the titanium phosphate gel such as iron sulfate, magnesium sulfate and silica sol are removed from the gel. The water content of the cake is about 71 % and the $TiO_2$:$P_2O_5$ molar ratio in the cake is about 3:1. The amounts of the titanium and phosphorus components contained in the waste sulfuric acid are determined to be 0.005 % (reckoned at $TiO_2$) and 0.01 % (reckoned at $P_2O_5$), respectively, of the amounts contained in the starting materials. Accordingly, it can be seen that substantially all of the titanium and phosphorus components contained in the starting materials are fixed in the titanium phosphate gel.

The titanium phosphate of a water content of 71 % is heated and dried to reduce the water content to 60 – 58 %, and it is molded into columns 1.5 mm in diameter and about 2 – 7 mm in length by means of a pelleter while kneading the dried cake.

The resulting columnar titanium phosphate gel is air-dried and its water content is adjusted to about 28 – 25 %. Thus, there are obtained non-sticky small masses of the titanium phosphate.

Although greater parts of metallic impurities have been removed by washing with warm water during the formation of the cake, the iron component in the unwashed portion and metallic impurities adsorbed in the titanium phosphate by its selective adsorbing property, such as vanadium, iron, manganese and aluminum components in the form of sulfates are still contained in the granular titanium phosphate gel. Because of the presence of such impurities the gel has a greenish brown color and it takes a dirty brownish yellow color when calcined as it is.

As a result of the solubility test of the small masses of the titanium phosphate gel having a water content of 24 – 23 %, it is confirmed that the solubility of the titanium component is only 0.001 %.

B. Treatment of small masses of the titanium phosphate with warm aqueous hydrochloric acid:

Greenish brown, small masses of the titanium phosphate gel are subjected to extraction of metallic impurities with warm aqueous hydrochloric acid in a closed circuit in the same manner as described in Example 2 by using the same extraction apparatus as employed in Example 2. As a result there is obtained a dried granular gel of substantially pure titanium phosphate.

C. Titanium phosphate product:

As a result of emission spectroanalysis of the so prepared titanium phosphate it is confirmed that the product is substantially free of metallic impurities such as vanadium, iron, manganese and chromium and it is substantially pure titanium phosphate.

The product is calcined at 800°C. and ground, and the whiteness of the ground product is examined by measuring the reflectivity of the product. The results of the measurement are shown in Table 4.

Table 4

| Wavelength (mµ) | Reflectivity (%) |
|---|---|
| 350 | 72.0 |
| 400 | 101.0 |
| 450 | 103.0 |
| 500 | 103.5 |

From the above-mentioned results, it can be seen that when small masses of the titanium phosphate gel prepared from iron sand slag and crude phosphoric acid as starting materials are treated with warm aqueous hydrochloric acid in a closed circuit, there can be obtained titanium phosphate excellent particularly in reflectivity of ultra-violet rays at a high yield.

EXAMPLE 4

This Example illustrates an embodiment in which titanium phosphate is formed from phosphoric acid and amorphous water-containing titanium oxide recovered by hydrolysis of a titanium salt solution obtained by treating ilmenite with sulfuric acid, thereafter the gel is stabilized and the metallic impurities are extracted therefrom to obtain substantially pure titanium phosphate.

A. Amorphous water-containing titanium oxide:

The titanium salt solution of sulfuric acid ($TiO_2$ content being 25.2 g/100 ml) prepared by the method described in (A) of Example 1 is used as the titanium salt solution of sulfuric acid obtained by treating ilmenite with sulfuric acid.

1 Liter of this titanium salt solution of sulfuric acid is heated at 120°C. in an autoclave to hydrolyze the titanium component. The hydrolyzed titanium component is precipitated in the form of a water-containing oxide.

The mother liquor is separated from the precipitate by filtration, and the residue is washed with water. Thus, a greater part of free sulfuric acid and metallic impurities composed mainly of iron components are removed and there is obtained a water-containing titanium oxide having a water content of 30.0 %. By X-ray diffraction it is confirmed that the oxide is amorphous.

B. Small masses of a stabilized titanium phosphate gel:

The so obtained amorphous titanium oxide of a water content of 30 % (350 g) is charged into a 5-liter capacity beaker charged with 3 liters of water. The oxide is dispsersed in water by stirring while heating at 60° – 70°C. About 150 ml of the crude phosphoric acid of a $P_2O_5$ concentration of 58.5 % recovered by the method described in Example 1 is gradually added to the aqueous dispersion of the water-containing titanium oxide. The heat aging is effected at 60° – 70°C. for about 1 hour to form a precipitate of a titanium phosphate gel.

The so formed titanium phosphate gel precipitate is separated from the mother liquor by a vacuum filter to recover it in the form of a plate-like cake.

In the same manner as described in Example 1, the free acid and metallic impurities are removed and collected.

The water content of the resulting filter cake is about 67 % and the $TiO_2:P_2O_5$ molar ratio is about 3:1. The contents of the titanium and phosphorus components in the waste sulfuric acid are 0.005 % (as $TiO_2$) and 0.01 % (as $P_2O_5$), respectively. Accordingly, it can be seen that substantially all of the titanium and phosphorus components are fixed in the cake of the titanium phosphate gel.

The cake of the titanium phosphate gel is dried to reduce its water content to about 45 % in the same manner as described in (A) of Example 3. Then, the dried cake is molded into columns 1.5 mm in diameter and 2 – 7 mm in length by means of a pelleter while kneading.

The resulting columnar titanium phosphate gel is air-dried to reduce its water content to 23 – 21 %. Thus, there are obtained non-sticky small masses of the stabilized titanium phosphate gel. As a result of the solubility test it is confirmed that the solubility of the titanium component is 0.001 %, and it can be seen that the titanium phosphate is made highly insoluble in an acid.

C. Extraction of metallic impurities:

Although greater parts of metallic impurities have been removed during the procedures for recovering the watercontaining titanium oxide described in (A), the above titanium phosphate still contains metallic impurities in amounts damaging the color hue of the product. Accordingly, in order to remove such metallic impurities without loss of titanium phosphate, the extraction of the stabilized titanium phosphate gel is effected with a 6N aqueous hydrochloric acid solution heated at 80°C. in the same manner as described in (C) of Example 1.

The titanium phosphate is allowed to contact hot air in the same manner as in (C) of Example 1 at the end of the extraction treatment to thereby release hydrochloric acid and water contained in the titanium phosphate. Thus, there is obtained a white titanium phosphate substantially free of metallic impurities.

The loss ratio of the titanium phosphate during the above extraction with heated 6N aqueous hydrochloric acid is determined to be less than 0.2 %. Accordingly, it can be seen that substantially pure titanium phosphate is obtained at high recovery ratio in accordance with this invention.

D. Titanium phosphate product:

As a result of emission spectroanalysis of the so prepared titanium phosphate it is confirmed that the product is substantially free of metallic impurities damaging whiteness of titanium phosphate such as vanadium, iron, chromium and manganese.

The product is calcined at 800°C. followed by grinding. The whiteness of the ground product is examined by measuring the reflectivity of the product. The results of the measurement are shown in Table 5.

Table 5

| Wavelength (mµ) | Reflectivity (%) |
|---|---|
| 350 | 71.0 |
| 400 | 101.0 |
| 450 | 103.0 |
| 500 | 103.0 |

From the above-mentioned results it can be seen that titanium phosphate excellent particularly in the reflectivity of ultra-violet rays is obtained at a high yield by treating small masses of the titanium phosphate gel formed from a crude phosphoric acid and a water-containing titanium oxide prepared from ilmenite, with warm aqueous hydrochloric acid.

EXAMPLE 5

This Example illustrates an embodiment of the preparation of substantially pure zirconium phosphate by stabilizing a wet gel of zirconium phosphate prepared from a crude phosphoric acid and a zirconium salt of sulfuric acid obtained by treating zircon sand with sulfuric acid and extracting metallic impurities from the stabilized gel with heated aqueous hydrochloric acid.

A. Formation of a zirconium phosphate gel:

As the starting material of the zirconium component of zirconium phosphate there is selected a zirconium salt solution of sulfuric acid of the following composition obtained by glassifying zircon sand, decomposing it with sulfuric acid, and removing the forming silicic acid component, the unreacted residue and the like from the resulting solution by filtration.

| $ZrO_2$ | 6.2 g/100 ml |
|---|---|
| $Fe_2O_3$ | 0.03 g/100 ml |
| $Al_2O_3$ | 0.01 g/100 ml |
| Free sulfuric acid ($H_2SO_4$) | 11.5 g/100 ml |

The same crude phosphoric acid having a $P_2O_5$ content of 58.5 % as used in Example 1 is selected as the starting material of the phosphorus component of zirconium phosphate.

The reaction of forming a zirconium phosphate gel is conducted by charging 28 ml of the crude phosphoric acid in a mixer (2000 r.p.m.), stirring it at room temperature, adding thereto 400 ml of the above-mentioned zirconium salt solution of sulfuric acid and continuing the agitation to form a white gelatinous precipitate of zirconium phosphate. Thus, there is obtained a viscous dispersion containing the gel composed mainly of zirconium phosphate. The $ZrO_2:P_2O_5$ molar ratio in the viscous mixture is 1:1. The so formed gel dispersion is separated into the gel and the mother liquor containing free sulfuric acid and other impurities by means of a vacuum filter. Thus, there is recovered a filter cake of the zirconium phosphate gel, of which water content is 74 %.

The filter cake of the zirconium phosphate gel of a water content of 74 % can be directly molded into columns 1 mm in diameter and about 2 - 7 mm in length by means of an extruder. The columnar molded product of the gel of a high water content is contacted with hot air and dried to thereby form non-sticky small masses of the zirconium phosphate gel of a water content of about 25 % [gel (a)].

When the above-mentioned zirconium phosphate gel of a water content of 74 % is heated and dried to reduce its water content to 30 % and the dried gel is molded by means of a pelleter, there can be also obtained small masses of the zirconium phosphate gel [gel (b)].

As a result of the solubility test of gels (a) and (b) it is confirmed that in each of gels (a) and (b) the solubility of the zirconium component (reckoned as $ZrO_2$) is 0.0001 % and it can be seen that the gels are highly stabilized against a concentrated acid.

For comparison, without separating the free sulfuric acid from the precipitate of the zirconium phosphate gel by filtration, the dispersion of the gel is heated and dried to remove water therefrom. In proportion to the advance of the drying treatment the concentration of the free sulfuric acid is heightened and at last the once formed zirconium phosphate is dissolved in the so concentrated sulfuric acid to form a sticky, millet jelly-like product, with the consequence that no granular gel can be obtained and the stabilization of zirconium phosphate is impossible. Accordingly, it can be understood that in stabilization of zirconium phosphate the removal of the free acid to a greater extent possible is effective for the stabilization.

B. Treatment of small masses of zirconium phosphate gels with warm aqueous hydrochloric acid:

The small masses of the stabilized zirconium phosphates (a) and (b) are subjected to an extraction treatment with a 6N aqueous hydrochloric acid solution heated at 70°C. for removal of metallic impurities from the small masses in the same manner as described in (C) of Example 1.

At the end of the extraction each of the treated zirconium phosphates is contacted with hot air in the same manner as described in (C) of Example 1. Thus, dried white products of zirconium phosphate substantially free of metallic impurities are obtained.

As a result of determination of the amount lost of the zirconium phosphate during the extraction step, it is confirmed that in each case the loss ratio is less than 0.01 %. Thus, it can be understood that in the case of either gel (a) or (b) zirconium phosphate is obtained at a high yield.

C. Zirconium phosphate products:

As a result of emission spectroanalysis of the so obtained two zirconium phosphate products it is confirmed that although a considerable amount of hafnium (Hf) accompanies zirconium, each product is substantially free of metallic impurities such as iron and aluminum.

Each product is calcined at 800°C., followed by grinding and whiteness of each ground product is examined by measuring the reflectivity according to a powder method. The results are shown in Table 6.

Table 6

| Wavelength (mμ) | Reflectivity (%) | |
| --- | --- | --- |
| | Product from gel (a) | Product from gel (b) |
| 350 | 102.0 | 102.0 |
| 400 | 105.0 | 105.0 |
| 450 | 106.0 | 106.0 |
| 500 | 107.0 | 107.0 |

From the above-mentioned results it can be seen that zirconium phosphate excellent particularly in the reflectivity of ultra-violet rays can be obtained by stabilizing a cake of the zirconium phosphate gel formed from zircon sand and crude phosphoric acid after reduction of the content of free sulfuric acid, by either (a) granulating the cake of a high water content as it is and then drying the granulated gel or (b) drying the cake to reduce a water content thereof and granulating the dried gel.

EXAMPLE 6

This Example explains influences of the $TiO_2:P_2O_5$ molar ratio in formation of a titanium phosphate precipitate from crude phosphoric acid and a sulfuric acid solution of titanium phosphate, recovered from ilmenite.

The titanium salt solution of sulfuric acid recovered from ilmenite in (A) of Example 1 is used as the starting material of the titanium component of titanium phosphate.

In formation of a precipitate of a wet gel of titanium phosphate, the mixing ratio of the starting crude phosphoric acid is changed so that the $TiO_2:P_2O_5$ molar ratio will be 1:0.2, 1:0.4, 1:0.6; 1:0.8 or 1:1.0. The formation of a precipitate of a titanium phosphate gel is effected in the same manner as described in (A) of Example 1. The precipitate is filtered to separate the precipitate cake from the mother liquor and the cake is washed with water in the same manner as described in (A) of Example 1. Thus, the removal of metallic impurities and free sulfuric acid is accomplished. The results of determination of the $TiO_2:P_2O_5$ molar ratio in each of the titanium phosphate gels formed at the above-mentioned molar ratios are shown in Table 7. From these results it can be understood that the titanium and phosphorus components are fixed in each gel at substantially the same molar ratio as that adopted at the precipitate formation and the titanium phosphate gel is formed at each molar ratio without substantially loss of either the titanium or phosphorus component.

Then, each titanium phosphate gel is pressed to reduce its water content to about 57 - 54 % and contacted with hot air to further reduce the water content to about 30 %. Then, the dried gel is molded into columns 1.5 mm in diameter and about 2 - 7 mm in length by means of a pelleter.

The resulting columnar gel of titanium phosphate is contacted with hot air of 200°C. to reduce its water content to 28 - 22 %. Thus, there are obtained small masses of a stabilized titanium phosphate gel.

The results of the solubility test of each stabilized gel are shown in Table 7.

Each of the so formed gels is treated with a 6N aqueous hydrochloric acid solution heated at 70°C. and dried with hot air in the same manner as described in (C) of Example 1 to obtain white titanium phosphate substantially free of metallic impurities.

As a result of emission spectroanalysis of each product it is confirmed that each titanium phosphate is substantially free of metallic impurities.

Table 7

| $TiO_2:P_2O_5$ mixing molar ratio | $TiO_2:P_2O_5$ molar ratio in gelatinous precipitate | Solubility (%) | $TiO_2:P_2O_5$ molar ratio in product |
| --- | --- | --- | --- |
| 1:0.2 | 1:0.25 | 0.001 | 1:0.25 |
| 1:0.4 | 1:0.4 | 0.001 | 1:0.4 |
| 1:0.6 | 1:0.6 | 0.001 | 1:0.6 |
| 1:0.8 | 1:0.7 | 0.001 | 1:0.7 |
| 1:1.0 | 1:0.9 | 0.001 | 1:0.9 |

From the results given above it can be seen that when the $TiO_2:P_2O_5$ mixing molar ratio is varied within a broad range of from 1:0.2 to 1:1.0 in formation of a gelatinous precipitate of titanium phosphate, substantially all of the titanium and phosphorus components can be fixed effectively in the form of titanium phosphate without substantial loss of both components and pure titanium phosphate in which the $TiO_2:P_2O_5$ molar ratio is substantially the same as the mixing molar ratio can be obtained.

EXAMPLE 7

This Example illustrates influences of the water content of the titanium phosphate gel obtained by the waterremoving treatment in the stabilization of the gel in a drying atmosphere.

As the titanium phosphate gel there is used a cake of the titanium phosphate gel of a water content of 71 % and a $TiO_2:P_2O_5$ molar ratio of 3:1 prepared from iron sand slag and crude phosphoric acid by the method described in (A) of Example 3. The cake is at first subjected to a water-removing treatment in a drying atmosphere to reduce its water content to 60.0 %, and then molded into columns 1.5 mm in diameter and about 2 - 7 mm in length by means of a pelleter.

The columnar gel is then subjected to the water-removing stabilization treatment in a drying atmosphere. Temperatures of 20°C., 70°C., 100°C., 150°C., 200°C. and 250°C are selected as temperatures of the drying atmosphere, the contacting time being 30 minutes or 60 minutes. Thus, there are obtained 10 kinds of small masses of dehydrated titanium phosphate gels, whose water contents are shown in Table 8.

Each gel is subjected to the solubility test, results of which are also shown in Table 8.

These ten gels are subjected to an extraction treatment with warm aqueous hydrochloric acid in the same manner as in (C) of Example 1 to remove metallic impurities therefrom.

Table 8

| Treating temperature (°C.) | Treating time (min) | Water content of treated titanium phosphate gel (%) | Solubility (%) |
| --- | --- | --- | --- |
| 20 | 30 | 59.5 | 1.5 |
| 70 | 30 | 55.8 | 1.2 |
| 100 | 30 | 51.5 | 0.6 |
| 150 | 30 | 32.9 | 0.005 |
| 200 | 30 | 19.2 | 0.001< |
| 250 | 30 | 0.42 | 0.001< |
| 20 | 60 | 59.0 | 1.1 |
| 50 | 60 | 45.0 | 0.4 |
| 70 | 60 | 37.5 | 0.01 |
| 100 | 60 | 30.2 | 0.005 |

From the results given above it can be understood that titanium phosphate gels stabilized against an action of an acid can be obtained regardless of the temperature of the drying atmosphere only by reducing the water contents of the starting gels to less than 45 %. From these stabilized titanium phosphate gels there can be obtained substantially pure titanium phosphates in which the presence of metallic impurities are not detected by emission spectroanalysis, by conducting the extraction treatment of metallic impurities in the same manner as described in (C) of Example 1.

EXAMPLE 8

This Example illustrates an embodiment in which phosphorus oxyacid salts of metals of Group IV b substantially free of metallic impurities are prepared by forming various gels of oxyacid salts of metals of Group IV b, stabilizing each gel and extracting each of the stabilized gels with warm aqueous hydrochloric acid.

A. Preparation of stabilized gels of phosphorus oxyacid salts of metals of Group IV b:

As the starting material of the metal components there are chosen the following four acid solutions; (a) the titanium salt solution of sulfuric acid prepared by the method described in (A) of Example 1 by treating ilmenite with sulfuric acid, (b) the zirconium salt solution of sulfuric acid prepared from zircon sand by the method described in (A) of Example 5, (C) a solution of commercially available zirconium oxychloride ($ZrOCl_2.8H_2O$) in 1N hydrochloric acid (the zirconium concentration reckoned as $ZrO_2$ is 3.7 g/100 ml), and (d) a solution of commercially available thorium nitrate [$Th(NO_3)_4.4H_2O$] in 1N nitric acid (the thorium concentration reckoned as $ThO_2$ is 7.92 g/100 ml).

As the phosphorus oxyacid or its reactive derivative there are chosen following 5 phosphorus oxyacids and 10 phosphorus oxyacid derivatives; (a) orthophosphoric acid ($H_3PO_4$), (b) metaphosphoric acid ($HPO_3$), (c) phosphorus acid ($H_3PO_3$), (d) hypophosphorous acid ($H_3PO_2$), (e) pyrophosphoric acid ($H_4P_2O_7$), (f) ammonium orthophosphate [$(NH_4)_2HPO_4$], (g) sodium orthophosphate ($Na_2HPO_4.12H_2O$), (h) calcium orthophosphate [$Ca_3(PO_4)_2$], (i) aluminum phosphate ($AlPO_4.nH_2O$), (j) zinc phosphate [$Zn_3(PO_4)_2.4H_2O$], (k) sodium metaphosphate ($NaPO_3$), (l) sodium pyrophosphate ($Na_4P_2O_7$), (m) sodium tripolyphosphate ($Na_5P_3O_{10}$), (n) sodium phosphite ($Na_2HPO_3$), and (o) refined phosphate rock (obtained by subjecting phosphate rock produced in Florida, U.S.A. to various refining treatments and having the composition of 38.50 weight % $P_2O_5$ 50.79 weight % CaO, 0.09 weight % $Fe_2O_3$, 0.8 weight % F and 0.2 weight % $SiO_2$ as main components).

In the same manner as described in (A) of Example 3 the reaction of forming gels of phosphorus oxyacid salts of metals of Group IV b are conducted by aging the starting materials of the Group IV b metal component and phosphorus oxyacid component in a 5-liter capacity beaker charged with 3 liters of water at 60° – 70°C. while stirring. The mixing molar ratio of metal component; phosphorus oxyacid component is about 3:1. In case the phosphorus oxyacid derivative is used as the starting material of the phosphorus component, the gel formation is effected in the presence of an acid in an amount at least equivalent to the salt.

Each of the resulting gels of phosphorus oxyacid salt of metals of Group IV b is separated from the mother liquor to form a cake of the gel. Then, the cake is washed with warm water to remove the free acid and greater parts of metallic impurities, and the washed cake is contacted with hot air of 150° – 200°C. to reduce its water content to 30 – 25 % while condensing and aging the phosphorus oxyacid salt of the metal of Group IV b. Then, the dried cake is molded into columns 1.5 mm in diameter and 2 – 7 mm in length by means of a pelleter. Thus, there are obtained stabilized gels of phosphorus oxyacids salts of metals of Group IV b. Each stabilized gel is subjected to the solubility test, results of which are shown in Table 9. In each gel the solubility is less than 0.5 %. Accordingly, it can be understood that each gel is suitably stabilized against an action of an acid.

For comparison, a wet gel formed from thorium nitrate and orthophosphoric acid is contacted with hot air of 150°C. directly without subjecting it to the water-washing treatment. In proportion to the advance of dehydration, the concentration of the free acid is heightened, and there cannot be obtained any granular gel but a liquid product. Accordingly, the stabilization is impossible. From this it can be seen that the substantial removal of the free acid is important.

B. Extraction of metallic impurities from gels of phosphorus oxyacid salts of metals of Group IV b:

Extraction of metallic impurities from small masses of each of the stabilized gels of phosphorus oxyacid salts of metals of Group IV b is conducted with the use of warm 6N hydrochloric acid in the same manner as described in (C) of Example 1. After completion of the extraction, the resulting phosphorus oxyacid salts of metals of Group IV b are contacted with hot air. Thus, in each run there is obtained a dried white phosphorus oxyacid salt of a metal of Group IV b. As a result of emission spectroanalysis of each product it is confirmed that each product is substantially free of metallic impurities. Thus, it can be understood that in each run the intended phosphorus oxyacid salt of a metal of Group IV b is obtained in a pure form at a high yield.

Table 8

| Starting materials | | Solubility Test |
| --- | --- | --- |
| Group IV b metal component | Phosphorus component | Solubility (%) |
| (a) Titanium salt solution of | Orthophosphoric acid | 0.001 |
| | Metaphosphoric acid | 0.001 |

Table 8-Continued

| Starting materials | | Solubility Test |
|---|---|---|
| Group IV b metal component | Phosphorus component | Solubility (%) |
| sulfuric acid prepared from ilmenite | Phosphorous acid | 0.005 |
| | Hypophosphorous acid | 0.005 |
| | Pyrophosphoric acid | 0.001 |
| | Ammonium orthophosphate | 0.002 |
| | Sodium orthophosphate | 0.002 |
| | Calcium orthophosphate | 0.001 |
| | Aluminum phosphate | 0.001 |
| | Zinc phosphate | 0.001 |
| | Sodium metaphosphate | 0.002 |
| | Sodium pyrophosphate | 0.002 |
| | Sodium tripolyphosphate | 0.002 |
| | Sodium phosphite | 0.005 |
| | Refined phosphate rock | 0.001 |
| (b) Zirconium salt solution of sulfuric acid prepared from zircon sand | Orthophosphoric acid | 0.0001 |
| | Metaphosphoric acid | 0.0001 |
| | Phosphorous acid | 0.0005 |
| | Pyrophosphoric acid | 0.0001 |
| | Sodium orthophosphate | 0.0002 |
| | Refined phosphate rock | 0.0002 |
| (c) Solution of zirconium oxychloride | Orthophosphoric acid | 0.0001 |
| | Metaphosphoric acid | 0.0001 |
| | Phosphorous acid | 0.0005 |
| | Pyrophosphoric acid | 0.0001 |
| (d) Solution of thorium nitrate | Orthophosphoric acid | 0.002 |
| | Metaphosphoric acid | 0.002 |
| | Phosphorous acid | 0.005 |
| | Pyrophosphoric acid | 0.002 |
| | Sodium orthophosphate | 0.002 |
| | Aluminum phosphate | 0.002 |
| | Refined phosphate rock | 0.005 |

EXAMPLE 9

This Example illustrates the case where the extraction of metallic impurities from small masses of the stabilized titanium phosphate gel is carried out by employing various extraction media.

As small masses of the stabilized titanium phosphate gel are chosen greenish brown small masses of the stabilized titanium phosphate gel containing metallic impurities that are prepared in the same manner as in (B) of Example 1 by spraying a fluid sol of titanium phosphate in dried air maintained at 200°C. and molded into small masses.

As the extraction medium there are chosen an aqueous solution of sulfuric acid of a concentration of 20 g/100 ml, an aqueous solution of sulfuric acid of a concentration of 35 g/100 ml, a 6N aqueous solution of nitric acid, and a 1N aqueous solution of hydrochloric acid containing 0.05 mol/l of EDTA (chelating agent). The extraction is carried out in the same manner as in Example 1 by using the same apparatus as used in Example 1. The temperature of the extraction medium is maintained at 80°C. In each run, 100 g of stabilized small masses to be extracted are charged in the extraction apparatus.

In each run, the point at which the pressure of any iron component is not observed in the recovered extraction medium is fixed as the point of completion of the extraction and the amount of the medium consumed till the completion of the extraction is measured. Results of the measurement are shown in Table 10.

Further, the amount lost of the titanium phosphate during the extraction is also measured. Results of the measurements are also shown in Table 10.

As a result of emission spectroanalysis of each of resulting titanium phosphate products it is confirmed that each product is substantially free of metallic impurities.

Table 10

| Class of extraction medium | Concentration | Amount used (ml) | Loss ratio of titanium phosphate (%) |
|---|---|---|---|
| Sulfuric acid | 20 g/100 ml | 1500 | 0.5 |
| Sulfuric acid | 35 g/100 ml | 1000 | 0.6 |
| Nitric acid | 6N | 500 | 0.4 |
| EDTA-incorporated hydrochloric acid | 1N | 2500 | 0.2 |

From the above-mentioned results it can be seen that even when sulfuric acid, nitric acid and hydrochloric acid incorporated with a chelating agent are used as the extraction medium, metallic impurities can be extracted conveniently from small masses of the stabilized titanium phosphate gel.

EXAMPLE 10

This Example illustrates the case where in the treatment of small masses of the titanium phosphate gel with warm aqueous hydrochloric acid, the concentration of the warm aqueous hydrochloric acid is changed.

As small masses of the titanium phosphate gel containing metallic impurities there are used small masses of the stabilized titanium phosphate gel prepared in accordance with the method described in (B) of Example 1.

The extraction of said small masses of the titanium phosphate gel containing metallic impurities is effected with aqueous hydrochloric acid of a concentration of 25, 20, 15, 10 or 5 % by weight in the same manner as in Example 2 by employing the apparatus described in Example 1 at temperatures ranging from 90° to 105°C.

The amount used of each aqueous hydrochloric acid (based on 1 kg of small masses of the titanium phosphate gel) is measured, and the presence of the iron component in the resulting titanium phosphaate is examined by emission spectroanalysis. The results are shown in Table 11.

Table 11

| Concentration of aqueous hydrochloric acid (% by weight) | Amount of aqueous hydrochloric acid (l) | Presence of iron component in product titanium phosphate |
|---|---|---|
| 25 | 8.5 | not observed |
| 20 | 8.5 | not observed |
| 15 | 8.5 | observed |
| 15 | 10 | not observed |
| 10 | 10 | observed |
| 10 | 14 | not observed |
| 5 | 20 | observed |

From the results given above it can be seen that in the extraction of metallic impurities from small masses of the stabilized titanium phosphate gel with warm aqueous hydrochloric acid a preferable concentration of the aqueous hydrochloric acid is in the range of from 25 to 10 % by weight. Of course it is possible to extract the metallic impurities even with aqueous hydrochloric acid of a low concentration such as 5 % by weight if the acid is used in a greater amount.

When aqueous hydrochloric acid of a much lower concentration is used as the extraction medium, the concentration is far from the azeotropic concentration of aqueous hydrochloric acid, namely 20 % by weight. Accordingly, in the case of low concentration aqueous hydrochloric acid, when the waste medium is concentrated to condense metallic impurities, the concentration of gasified aqueous hydrochloric acid is further reduced at the primary stage of the concentration, and such low concentration gasified aqueous hydrochloric acid cannot be reused efficiently as the extraction medium. In this point the use of a much lower concentration extraction medium of aqueous hydrochloric acid is disadvantageous.

When the waste hydrochloric acid recovered in each run is heated to condense metallic impurities contained therein, vapor of aqueous hydrochloric acid is formed, and it is efficiently used as a medium for heating the extraction medium of aqueous hydrochloric acid.

EXAMPLE 11

This Example explains influences of the treatment temperature in the extraction of metallic impurities from small masses of the stabilized titanium phosphate gel.

As the stabilized phosphate gel there are used greenish brown small masses of the stabilized titanium phosphate gel containing metallic impurities that are obtained in the same manner as in (B) of Example 1 by spraying a fluid sol of titanium phosphate into dried air maintained at 200°C. Said small masses (100 g) are charged in the extraction column of the extraction apparatus described in (C) of Example 1.

As the extraction medium there is used 6N aqueous hydrochloric acid heated at 20°, 40°, 60° or 90°C. The outside of the extraction column is heated to the temperature corresponding to the temperature of the extraction medium, and the extraction is continued until any iron component is not observed in the recovered extraction liquid. The amount used of the extraction medium at each temperature is measured. The results of the measurement is shown in Table 12.

Table 12

| Treatment temperature (°C.) | Amount used of aqueous hydrochloric acid (ml) | Loss ratio of titanium phosphate (%) |
|---|---|---|
| 20 | 5000 | 0.2 |
| 40 | 3000 | 0.3 |
| 60 | 500 | 0.4 |
| 90 | 300 | 0.4 |

From the results given above it can be understood that a treatment temperature higher than 40°C. metallic impurities can be conveniently extracted from small masses of the stabilized titanium phosphate gel with a small amount of the extraction acid.

EXAMPLE 12

This Example illustrates another embodiment of extraction of metallic impurities from small masses of the stabilized titanium phosphate gel.

As the stabilized titanium phosphate gel there are chosen greenish brown small masses of the stabilized titanium phosphate containing metallic impurities that are prepared in accordance with the method described in (B) of Example 1. Said small masses (10 kg) are charged in a lead-lined longitudinal extraction column 40 cm in diameter and 50 cm in height. Aqueous sulfuric acid of a concentration of 25 g/100 ml heated at 70° – 80°C. is circulated as the extraction medium from the bottom of the column upwardly by means of a pump. This circulating extraction is continued until the increase of the metallic impurities such as the iron component is not observed in the extraction medium. Then, the extraction medium attached by the metallic impurities is removed from the extraction column, and then the extraction is further continued with water until the presence of the sulfuric acid component is not observed in the extraction water. Then, the resulting water-washed titanium phosphate is calcined at 800°C. Thus, there is obtained a pure white calcined product of titanium phosphate.

The loss ratio of the titanium phosphate during the above-mentioned extraction with heated aqueous sulfuric acid of a concentration of 25 g/100 ml is 0.7 %. Accordingly, it can be understood that in this embodiment titanium phosphate is recovered at a high ratio.

As a result of emission spectroanalysis of the above product it is confirmed that the product is substantially free of metallic impurities. Accordingly, it can be seen that the extraction and removal of metallic impurities from the stabilized titanium phosphate gel can be efficiently accomplished also in this embodiment.

What we claim is:

1. A process for the preparation of substantially pure phosphorus oxyacid salts of metals of Group IV b of the Periodic Table which comprises (a) reacting a compound of a metal of Group IV b containing metallic impurities and being capable of reacting with a phosphorus oxyacid, with a phosphorus oxyacid or its reactive derivative in the presence of water at a molar ratio, expressed in terms of $MO_2:P_2O_5$ wherein M is the metal of Group IV b of 1:1.5 - 1:0.1; (b) separating the formed gelatinous precipitate of the phosphorus oxyacid salt of the metal of Group IV b from the mother liquor by filtration; (c) converting the obtained filter cake to a fluid sol by means of shear agitation and then scattering the sol into a heating atmosphere to form a granular gel of the phosphorus oxyacid salt of Group IV b having a water content of less than 45%, said granular gel having such a property that when it is added in an amount of 5% by weight to an aqueous solution of sulfuric acid having a concentration of 20 g/100 ml and the mixture is boiled for 10 minutes, the solubility of the Group IV b metal component is less than 0.5%; and (d) extracting said granular gel of the phosphorus oxyacid salt of the metal of Group IV b with an acid or its vapor in the presence of water to thereby remove metallic impurities therefrom.

2. The process of claim 1 wherein the concentration of the compound of the metal of Group IV b in the reaction system is less than 4% by weight calculated as $MO_2$, wherein M is the metal of Group IV b.

3. The process of claim 1 wherein the reaction between the compound of the metal of Group IV b and the phosphorus oxyacid salt or its reactive derivative is effected at a temperature of 30°–80°C.

4. The process of claim 1 wherein the content of free acid in the gel of the phosphorus oxyacid salt of the metal of Group IV b is maintained at less than 20% by weight based on the water content of said gel.

5. A process for the preparation of substantially pure phosphorus oxyacid salts of metals of Group IV b of the Periodic Table which comprises (a) reacting a compound metal of Group IV b containing metallic impurities and being capable of reacting with a phosphorus oxyacid, with a phosphorus oxyacid or its reactive derivative in the presence of water at a molar ratio, expressed in terms of $MO_2:P_2O_5$ wherein M is the metal of Group IV b, of 1:1.5–1:0.1, the concentration of $MO_2$ wherein M is as defined above in the reaction system being less than 10% by weight; (b) separating the forming gelatinous precipitate of the phosphorus oxyacid salt of the metal of Group IV b from the mother liquor by filtration; (c) adjusting the amount of the free acid in the filter cake to less than 20% by weight based on the water content of the gel; (d) converting the obtained filter cake to a fluid sol by means of shear agitation and then scattering the sol into a heating atmosphere maintained at 100°–500°C. to form a granular gel of the phosphorus oxyacid salt of the metal of Group IV b having a water content of less than 45%, said granular gel having such a property that when it is added in an amount of 5% by weight to an aqueous solution of sulfuric acid having a concentration of 20 g/100 ml and the mixture is boiled for 10 minutes, the solubility of the metal component of Group IV b is less than 0.5%; and (e) extracting the granular gel of the phosphorus oxyacid salt of the metal of Group IV b with an acid or its vapor in the presence of water to thereby remove the metallic impurities therefrom.

6. A process for the preparation of substantially pure phosphorus oxyacid salts of metals of Group IV b of the Periodic Table which comprises (a) reacting a compound of a metal of Group IV b containing metallic impurities and being capable of reacting with a phosphorus oxyacid, with a phosphorus oxyacid or its reactive derivative in the presence of water at a molar ratio, expressed in terms of $MO_2:P_2O_5$ wherein M is the metal of Group IV b, of 1:1.5–1:0.1, the concentration of $MO_2$ wherein M is as defined above in the reaction system being less than 10% by weight; (b) separating the forming gelatinous precipitate of the phosphorus oxyacid salt of the metal of Group IV b from the mother liquor by filtration; (c) adjusting the amount of the free acid in the filter cake to less than 20% by weight based on the water content of the gel; (d) drying the resulting filter cake to such an extent that the dried cake has a water content of 60–35% but still retains a thixotropic property, then pelletizing the dried cake to form a granular gel of the phosphorus oxyacid salt of the metal of Group IV b and, when the water content of the resulting granular gel is higher than 45%, drying the pelletized product until the water content becomes less than 45%, said granular gel having such a property that when it is added in an amount of 5% by weight to an aqueous solution of sulfuric acid having a concentration of 20 g/100 ml and the mixture is boiled for 10 minutes, the solubility of the metal component of Group IV b is less than 0.5%; and (e) extracting the granular gel of the phosphorus oxyacid salt of the metal of Group IV b with an acid or its vapor in the presence of water to thereby remove the metallic impurities therefrom.

7. The process of claim 6 wherein the pelletized granular gel is dried at a temperature of 30°–500°C.

8. A process for the preparation of substantially pure zirconium salts of phosphorus oxyacids which comprises (a) reacting a zirconium compound containing metallic impurities and being capable of reacting with a phosphorus oxyacid or its reactive derivative in the presence of water at a $ZrO_2:P_2O_5$ molar ratio of 1:1.5 – 1:0.1, the concentration of $ZrO_2$ in the reaction system being less than 10% by weight; (b) separating the forming gelatinous precipitate of the zirconium salt of the phosphorus oxyacid from the mother liquor by filtration; (c) adjusting the amount of the free acid in the filter cake to less than 20% by weight based on the water content of the gel; (d) pelletizing the resulting filter cake and then drying the pelletized product at 20°–500°C. to reduce its water content to 45 – 25 %, said pelletized granular gel having such a property that when it is added in an amount of 5 % by weight to an aqueous solution of sulfuric acid having a concentration of 20 g/100 ml and the mixture is boiled for 10 minutes, the solubility of the metal component of Group IV b is less than 0.5 %; and (e) extracting the granular gel of the zirconium salt of the phosphorus oxyacid with an acid or its vapor in the presence of water to thereby remove the metallic impurities therefrom.

9. A process for the preparation of substantially pure phosphorus oxyacid salts of metals of Group IV b of the Periodic Table which comprises (a) reacting a compound of a metal of Group IV b containing metallic impurities and being capable of reacting with a phosphorus oxyacid, with a phosphorus oxyacid or its reactive derivative in the presence of water at a molar ratio, expressed in terms of $MO_2:P_2O_5$, wherein M is the metal of Group IV b, of 1:1.5–1:0.1; (b) separating the forming gelatinous precipitate of the phosphorus oxyacid salt of the metal of Group IV b from the mother liquor by filtration; (c) drying the obtained filter cake to such an extent that the dried cake has a water content of less than 60% but still retains a thixotropic property, then pelletizing the dried cake to form a granular gel of the phosphorus oxyacid salt of the metal of Group IV b and, when the water content of the pelletized product is higher than 45%, drying the pelletized product until the water content is reduced to less than 45%, said granular gel having such a property that when it is added in an amount of 5% by weight to an aqueous solution of sulfuric acid having a concentration of 20 g/100 ml and the mixture is boiled for 10 minutes, the solubility of the Group IV b metal component is less than 0.5%; and (d) extracting the granular gel of the phosphorus oxyacid salt of the metal of Group IV b with an acid or its vapor in the presence of water to thereby remove metallic impurities therefrom.

* * * * *

UNITED STATES PATENT OFFICE
CERTIFICATE OF CORRECTION

Patent No. 3,914,381  Dated October 21, 1975

Inventor(s) Yujiro Sugahara et al.

It is certified that error appears in the above-identified patent and that said Letters Patent are hereby corrected as shown below:

Please change priority imformation to read as follows:

Delete "April 7, 1970" and insert -- February 25, 1970 --

Signed and Sealed this sixth Day of January 1976

[SEAL]

Attest:

RUTH C. MASON
*Attesting Officer*

C. MARSHALL DANN
*Commissioner of Patents and Trademarks*